US009681099B1

United States Patent
Deets, Jr.

(10) Patent No.: US 9,681,099 B1
(45) Date of Patent: Jun. 13, 2017

(54) MULTIPLEX LIVE GROUP COMMUNICATION

(71) Applicant: Facebook, Inc., Menlo Park, CA (US)

(72) Inventor: Charles Donald Deets, Jr., Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/195,834

(22) Filed: Jun. 28, 2016

(51) Int. Cl.
- *H04N 7/14* (2006.01)
- *H04L 29/06* (2006.01)
- *H04L 12/58* (2006.01)
- *H04N 7/15* (2006.01)
- *G06F 3/16* (2006.01)

(52) U.S. Cl.
CPC ............ *H04N 7/147* (2013.01); *G06F 3/16* (2013.01); *H04L 51/24* (2013.01); *H04L 65/403* (2013.01); *H04N 7/15* (2013.01)

(58) Field of Classification Search
CPC ....................................................... H04N 7/14
USPC ................................ 348/14.01, 14.08, 14.03
See application file for complete search history.

(56) References Cited

U.S. PATENT DOCUMENTS

| | | | | |
|---|---|---|---|---|
| 8,331,971 B2* | 12/2012 | Turcanu | ................. | H04M 3/56 455/416 |
| 8,754,924 B1* | 6/2014 | Shane | ..................... | H04N 7/15 348/14.05 |
| 2012/0200658 A1* | 8/2012 | Duckworth | ............ | H04N 7/152 348/14.07 |
| 2015/0121252 A1* | 4/2015 | Yerli | ................... | H04L 65/4069 715/753 |
| 2015/0201161 A1* | 7/2015 | Lachapelle | ............. | H04N 7/15 348/14.07 |
| 2015/0358577 A1* | 12/2015 | Zhou | ...................... | H04L 51/10 348/14.01 |

\* cited by examiner

*Primary Examiner* — Olisa Anwah
(74) *Attorney, Agent, or Firm* — Baker Botts L.L.P.

(57) ABSTRACT

In one embodiment, a method includes receiving from a first group member a request to initiate a multiplex live communication with members of a group, wherein the first group member belongs to the group; sending a notification to each of one or more second group members notifying the one or more second group members that a multiplex live communication among members of the group is underway, wherein the one or more second group members belongs to the group; receiving one or more requests from a first subset of the one or more second group members to join the multiplex live communication; initiating the multiplex live video communication between the first group member and the first subset of the one or more second group members who requested to join the multiplex live communication.

18 Claims, 10 Drawing Sheets

MULTIPLEX LIVE GROUP COMMUNICATION

TECHNICAL FIELD

This disclosure generally relates to communication over a network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments a communication system may enable two or more users to be members of a group in an online social network. Such a group may require the users to register with the group or otherwise officially join the group to be considered members of the group. In particular embodiments the communication system may be a social-networking system. The communication system may provide an interface and network for conducting multiplex live group communication. Such multiplex live group communication may also be referred to as a group chat. Members of an existing and pre-defined group on the online social network may participate in a group chat that is unique to that group. Only members of the group may participate in the group chat. Registration within the group may be based on that group's privacy settings.

The multiplex live group communication may take place via a group chat interface that is accessed through an interface associated with the group. The group chat interface may allow group members to join the chat and become group chat participants. The group chat interface may also allow group chat participants to leave the group chat, to post comments to the group chat, to mute the group chat, to record the group chat, or to do any other suitable action within the group chat. The group chat may comprise audio and visual data or simply audio data, according to group chat participants' preferences.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments a communication system may enable two or more users to be members of a group in an online social network. Such a group may require the users to register with the group or otherwise officially join the group to be considered members of the group. In particular embodiments the communication system may be a social-networking system. The communication system may provide an interface and network for conducting multiplex live group communication. Such multiplex live group communication may also be referred to as a group chat. Members of an existing and pre-defined group on the online social network may participate in a group chat that is unique to that group. Only members of the group may participate in the group chat. Registration within the group may be based on that group's privacy settings.

The multiplex live group communication may take place via a group chat interface that is accessed through an interface associated with the group. The group chat interface may allow group members to join the chat and become group chat participants. The group chat interface may also allow group chat participants to leave the group chat, to post comments to the group chat, to mute the group chat, to record the group chat, or to do any other suitable action within the group chat. The group chat may comprise audio and visual data or simply audio data, according to group chat participants' preferences.

Figure 1:
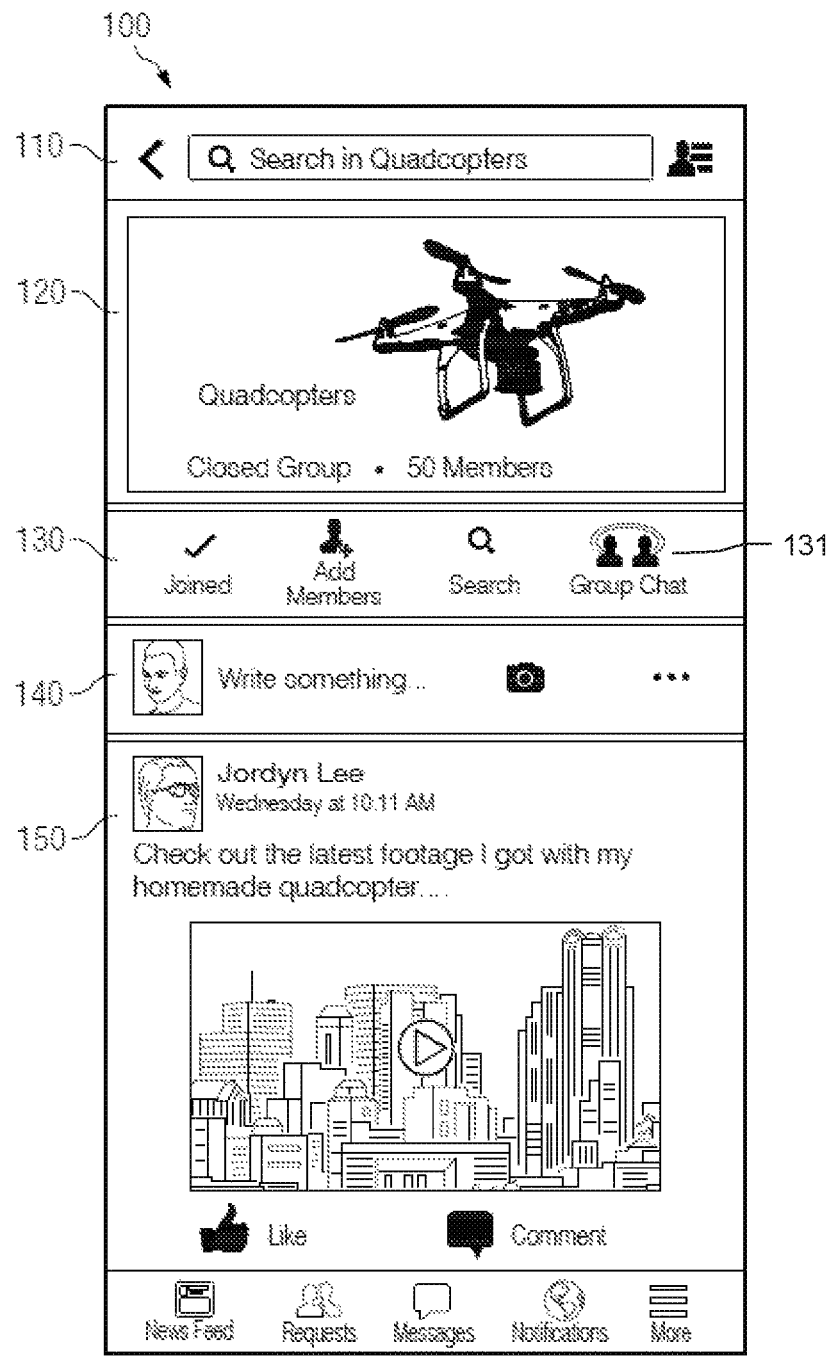
FIG. 1 illustrates an example user interface for initiating a multiplex live group communication.

FIG. 1 illustrates an example user interface 100 for initiating a multiplex live group communication over a communication system. User interface 100 may be a group member interface hosted by a social networking system. In particular embodiments the communication system may be the social networking system. The group member interface may be an interface for a particular group of users of an online social network. A "group" on the online social network may be a virtual place for group communication and for users to share common interests and express their opinions. Groups of this nature allow users to virtually come together via the online social network around a common cause, issue or activity. A group may be made for any purpose, from members of a church group or athletic team, to serious topics on politics and world events, to more lighthearted purposes. As an example and not by way of limitation, a group on the online social network may exist called "Quadcopters." Its purpose may be to create a virtual space for its members to discuss anything related to quadcopters and remote controlled drones, such as how to build and program home-made quadcopter, or for group members to share recent video footage that they have captured using their drone or quadcopter. Another example of a group on the online social network may be a group called "Badly Stuffed Animals," where group members may share pictures of bizarre taxidermy animals. To create a group, a user may decide whether to make the group public, closed, or secret. If the group is public, some aspects of the group may be public. If the group is closed or secret, some aspects of the group will be closed to the public. Table 1 discusses example group privacy settings on the online social network.

may each receive a notification letting them know of the new post. New posts may also be included in a newsfeed or stream of each group member.

User interface 100 may include top bar 110, title bar 120, action bar 130, post composition bar 140, and post display area 150. Top bar 110 may include a back icon, a search field, a menu icon, or any other suitable element. Title bar 120 may include a title, photograph, and other suitable descriptive language or elements. Action bar 130 may include icons that group members may select (e.g., by clicking, tapping, or otherwise selecting) for performing various functions, including joining or leaving the group, adding new members to the group, searching posts within the group, or performing any other suitable action. By selecting group chat icon 131, a group member may initiate a multiplex live group communication (e.g., group chat). Post composition bar 140 may be an area for group members to post comments, photos, videos, files, website URLs, or any other suitable media to the group. Comment area 150 may be an area where group members' posts are displayed. Group members may comment on posts in comment area 150. Comments may comprise text, photos, videos, hyperlinks to websites, files, or any other suitable content.

As an example and not by way of limitation, a group may exist called "Quadcopters." Its purpose may be to create a virtual space for its members to discuss anything related to quadcopters and remote controlled drones, such as how to build and program home-made quadcopter, or for group members to share recent video footage that they have captured using their drone or quadcopter. The group may be a "closed group," which may mean that anyone can ask to join or be added or invited by a member of the Quadcopter group. Further, anyone may be able to see the group's name, who is in the group, the group's description, and the group's tags. Only current members may be able to see what other members post to the group, and only current members may

TABLE 1

Example Group Privacy Settings

|  | Public | Closed | Secret |
| --- | --- | --- | --- |
| Who can join? | Anyone can join or be added or invited by a member | Anyone can ask to join or be added or invited by a member | Anyone, but they have to be added or invited by a member |
| Who can see the group's name? | Anyone | Anyone | Current and former members |
| Who can see who's in the group? | Anyone | Anyone | Only current members |
| Who can see the group description? | Anyone | Anyone | Current and former members |
| Who can see the group tags? | Anyone | Anyone | Current and former members |
| Who can see what members post in the group? | Anyone | Only current members | Only current members |
| Who can find the group in search? | Anyone | Anyone | Current and former members |
| Who can see stories about the group on Facebook (ex: Newsfeed and search)? | Anyone | Only current members | Only current members |

To become a member of a group, a user may first be required to join the group. Once the user has joined, she may now be considered to be a "group member." Group members may post content to the group via user interface 100. The content may include text, photos, videos, hyperlinks to websites, files, or any other suitable content. When a group member posts content to the group, the other group members see stories about the group on a newsfeed or stream on the online social network. Group members may be able to post content to the group, for other group members to view. As an example and not by way of limitation, a user named Jordyn Lee may be a member of the Quadcopter group. In order to post to the group, see other group members' posts, interact with any icons on top bar 110, title bar 120, action bar 130, post composition bar 140, or even to access user interface 100, Jordyn must first be a member of the Quadcopter group. Once a member she may post content, such as a video of the latest footage she captured with the quadcopter she made herself. Jordyn may also select group chat icon 131 to initiate a multiplex live group communication.

The multiplex live group communication may be openly joinable according to the predefined privacy of the group. If the group is public, some aspects of the group chat may be public (e.g., anyone can view and participate, or alternatively only group members can participate, but anyone can view and post comments associated with the chat). If the group is closed or secret, some aspects of the group chat may be closed (e.g., only group members can participate and post comments in the chat). Group membership may be a prerequisite to join a group chat. A user may be able to join a group and join a group chat while the group chat is underway. The group hosted by the communication system or social-networking system may define the audience of the group chat.

The group privacy settings or configuration may define who can see the group chat. Group membership may define who can engage in the group chat (e.g., participate in the group chat with audio/visual input, or only make comments). The initiator of the group chat may define when the group chat begins and ends.

Figure 2:
FIG. 2 illustrates another example user interface for initiating a multiplex live group communication.

FIG. 2 illustrates another example user interface 200 for initiating a multiplex live group communication. FIG. 2 may be a group member interface that is displayed after a group member has selected group chat icon 131. User interface 200 may include exit icon 201, camera-flip icon 202, video display area 203, and continue icon 204. The exit icon 201, when selected, may exit the group member from user interface 200. In response to the group member selecting exit icon 201, user interface 100 may be displayed. Camera-flip icon 202 may toggle the active camera (e.g., the camera that is capturing what is being displayed on the screen) between the user-facing camera and the rear camera (e.g., the camera that is not the user-facing camera). Video display area 203 may display images captured by the active camera. The active camera may default to the user-facing camera, so that video display area 203 most likely displays an image of the user's face and upper body. Video display area 203 may include any suitable instructions or information. The group member may select continue icon 204 to proceed with the group chat. When continue icon 204 is selected, the multiplex live group communication may begin. At this point, the social-networking system that hosts the online social network may send notifications to the group members, notifying them that a group chat in underway. The group members may have the option to join the group chat by selecting the appropriate icon to join the group chat. Alternatively, the user may be presented with another user interface to select group members to invite to the group chat, as discussed below.

Figure 3:
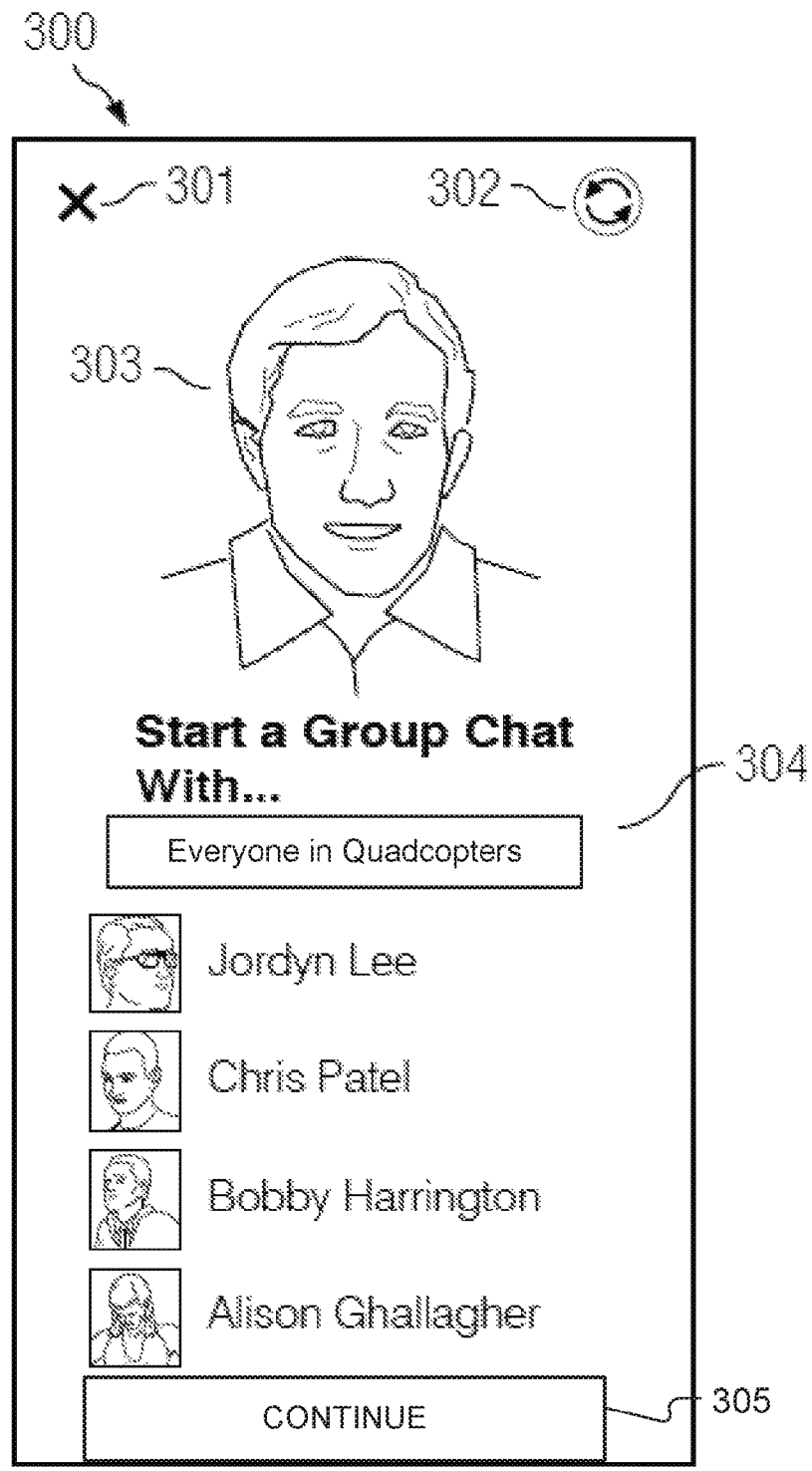
FIG. 3 illustrates another example user interface for initiating a multiplex live group communication.

FIG. 3 illustrates another example user interface 300 for initiating a multiplex live group communication. User interface 300 may be displayed in addition to or as an alternative for user interface 200. User interface 300 may include the same components as user interface 200 (e.g., exit icon 301, camera-flip icon 302, video display area 303, continue icon 305), with the addition of group member selection icons 304. Using group member selection icons 304, the group member who initiates the group chat may select which group members to invite to the group chat. As an example and not by way of limitation, if a user Corey is a member of the Quadcopters group and wishes to initiate a group chat with particular members of the Quadcopters group, he may select group chat icon 131. In response, user interface 300 may be displayed. A list of group member selection icons 304 may be displayed on user interface 300. Each group member selection icon may represent one of the members of the Quadcopters group. If the Quadcopters group has 50 members, then 50 group member selection icons 304 may be displayed, each representing a single member. Corey may view all 50 group member selection icons 304 by scrolling down user interface 300 (e.g., by swiping, scrolling, or any other suitable method). Corey may select as many group member selection icons as he wishes, including "everyone in Quadcopters." When Corey is satisfied with his selection, he may select continue icon 305 to proceed to the group chat. In response to the selection of continue icon 305, the multiplex live group communication may begin. Alternatively, in response to the selection of continue icon 305, notifications may be sent to group members notifying them of the group chat invitation. The multiplex live group communication may begin as soon as one additional group member joins the group chat.

Figure 4:
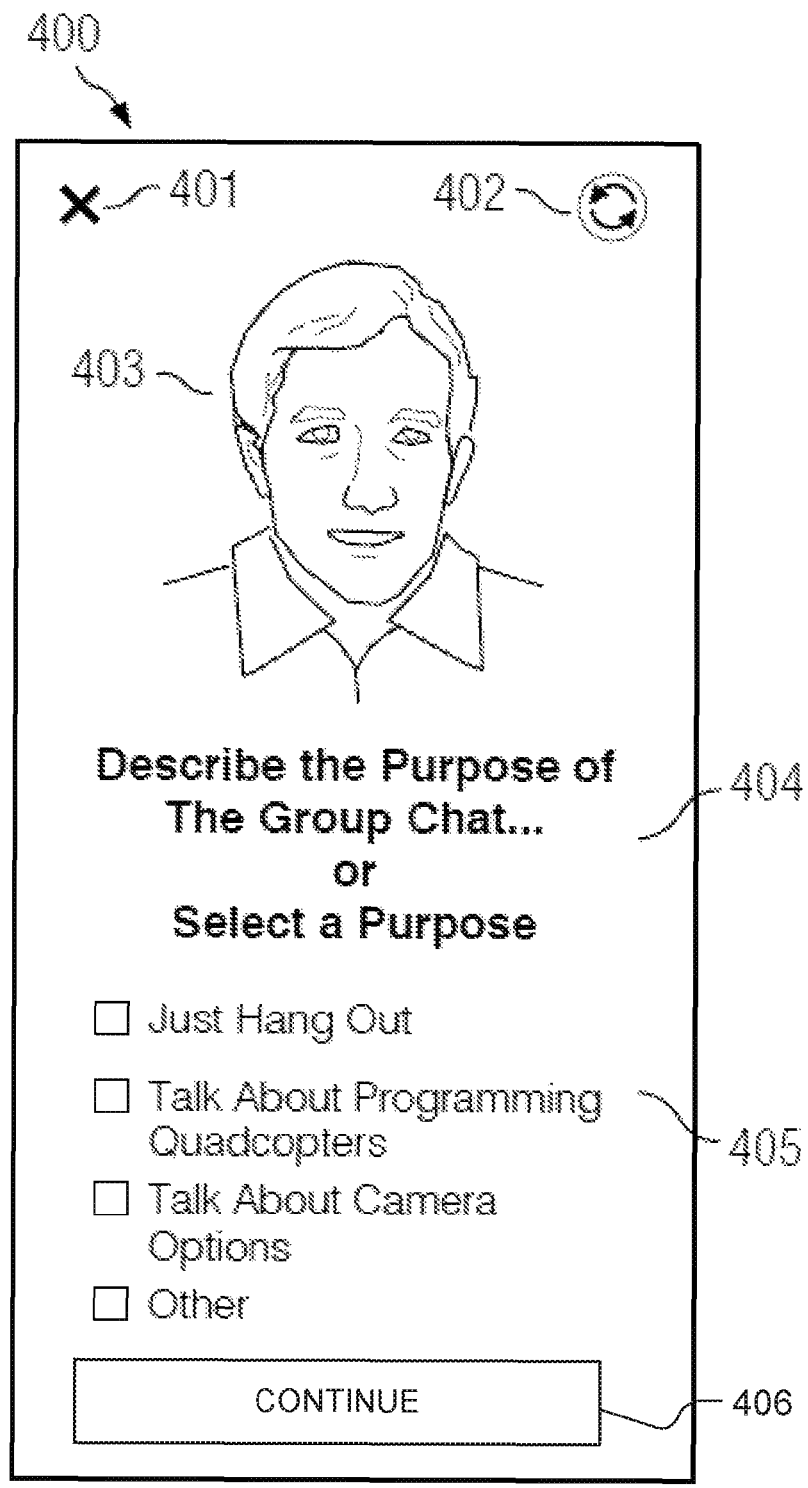
FIG. 4 illustrates another example user interface for initiating a multiplex live group communication.

FIG. 4 illustrates another example user interface 400 for initiating a multiplex live group communication. User interface 400 may be displayed in addition to or as an alternative for user interface 200 and user interface 300. User interface 400 may include the same components as user interface 300 (e.g., exit icon 401, camera-flip icon 402, video display area 403, continue icon 405), with the addition of chat description region 404 or chat purpose selection icons 405. Using either chat description region 404 or chat purpose selection icons 405, a group member may describe the purpose of the group chat or simply select a purpose. This may be helpful because when group members receive notifications about the group chat, they may be informed about the nature of the group chat, and may thus be able to make a more informed decision about whether to join the chat or not. As an example and not by way of limitation, if a user Corey is a member of the Quadcopters group and wishes to initiate a group chat with particular members of the Quadcopters group, he may select group chat icon 131. In response, user interface 300 may be displayed. Corey may proceed with selecting which group members to invite to the group chat as described above. When Corey selects continue icon 305, user interface 400 may be displayed, and Corey may be able to describe the purpose of the group chat in chat description region 404, or select a purpose for the group chat by selecting one of the chat purpose selection icons 405. In particular embodiments, chat purpose selection icons 405 may comprise recent group chat purposes, popular group chat purposes, pre-defined group chat purposes, or any other suitable group chat purpose. When Corey is satisfied with his description or selection, he may select continue icon 406 to proceed to the group chat. In response to the selection of continue icon 406, the multiplex live group communication may begin. Alternatively, in response to the selection of continue icon 406, notifications may be sent to group members notifying them of the group chat invitation. The multiplex live group communication may begin as soon as one additional group member joins the group chat. The above discussion of FIGS. 3 and 4 are examples only and are not necessary embodiments of this disclosure.

Figure 5:
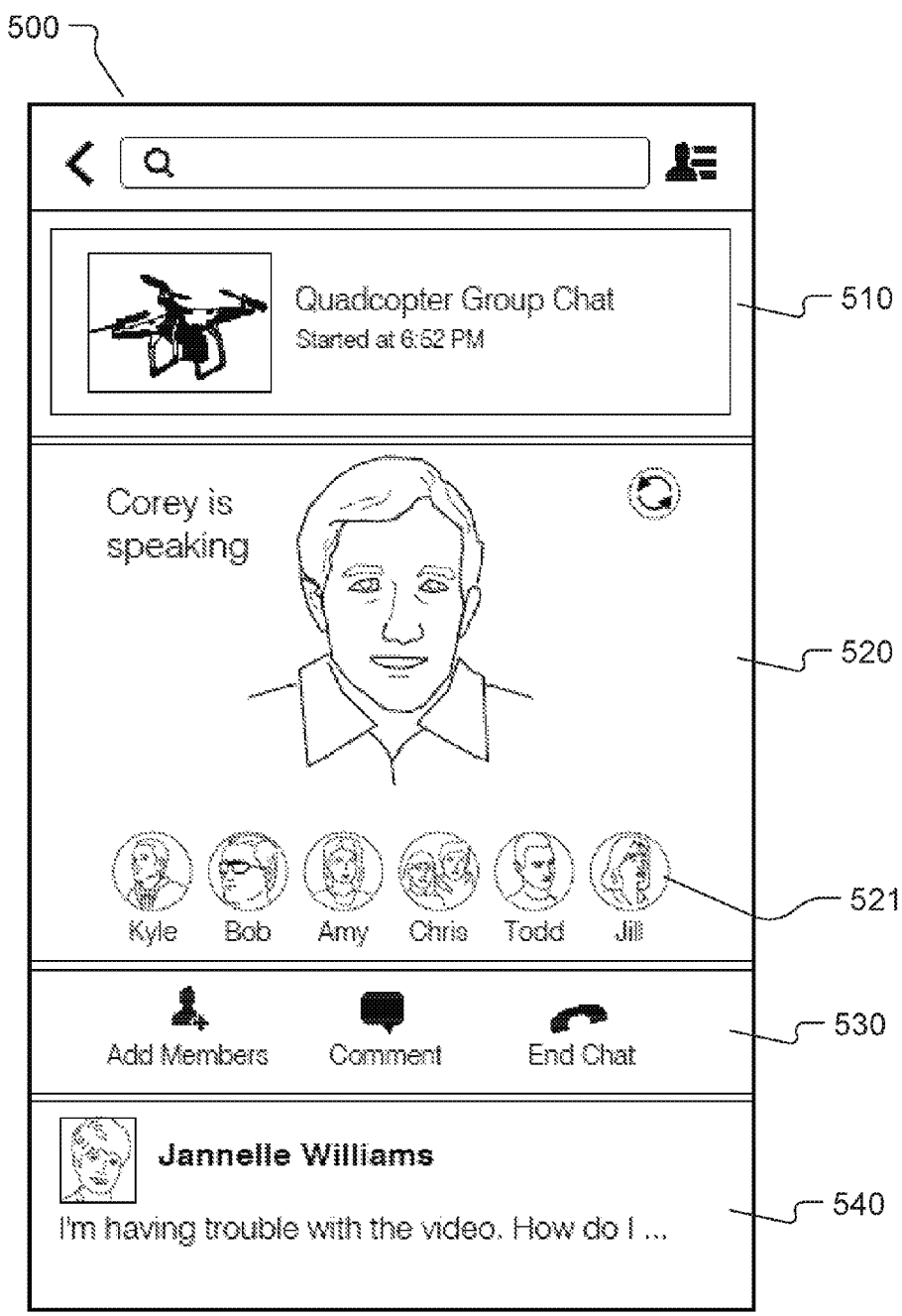
FIG. 5 illustrates an example interface for conducting a multiplex live group communication.

FIG. 5 illustrates an example interface 500 for conducting a multiplex live group communication. Interface 500 may include title bar 510, video display area 520, participant icons 521, action bar 530, and comment section 540. Title bar 510 may display the group's name and indicate that a group chat is underway. Title bar 510 may also display any other relevant information, such as the time the group chat started, or the purpose of the group chat. Video display area 520 may display a video stream of at least one group member who is participating in the group chat. In particular embodiments, the communication system may detect which participant is speaking by analyzing the audio wave forms that are picked up by each group member participant's computing device. As an example and not by way of limitation, Corey may be speaking, and the communication system may detect that the audio activity coming from Corey's computing device is more active than the audio activity from any of the other devices. In response, the communication system may display a video stream the images captured by Corey's active camera in video display area 520. If another group member participant begins speaking, the communications system may switch displays to whichever participant is speaking. For example, if Corey asks Jill a question about how she built her quadcopter to hold a heavier camera, and Jill responds, the images displayed in video display area 520 may switch from the images captured by Corey's active camera to the images captured by Jill's active camera at the moment when Jill begins to speak or after a brief delay (e.g., 1 second). Participant icons 521 may display the group members who are participating in the group chat. Each participant icon 521 may correspond to a group member. If there are too many group members participating to adequately display all participant icons 521, the communication system may select which participant icons to display. The selection of which participant icons to display may depend on the group's settings, the preferences of users, or the settings of the communication system. For example, the communication system may display participant icons corresponding to the participants who most recently spoke, who have spoke the most, or who are the group or chat administrators. Alternatively, the communications system may display different participant icons on different group members' computing devices. The displayed participant icons may depend on social networking activity and affinity between different members. For example, if Amy and Chris are friends with each other, but are not friends with any other members in the group, Chris's participant icon may always be displayed on Amy's display screen in the participant icon section 521 and vice versa. That way, Chris and Amy may feel like they always have a friend nearby in the group chat. This may raise the level of engagement among all group chat participants.

Action bar 530 may enable group members to perform various functions related to the group or to the group chat. For example, a group member may add other group members to the group chat, may make comments that will appear in the comment section 540, leave the chat, end the chat, mute their speaker, mute their microphone, or perform any other suitable action. Some actions on action bar 530 may be limited to certain group members only (e.g., only group administrators or the group member who initiated the group chat may invite new group members to the chat or remove group members from the chat).

Comment section 540 may be an area where any group member may post comments. Comments may comprise text, images, URLs, video, or any other suitable content. Posting to the comment section may not be limited to group members who are participating in the chat; any member of the group may be able to post in comment section 540. This may be helpful because group members who are not part of the group chat may still contribute or ask questions. As an example and not by way of limitation, assume a group exists called "Breaking Bad Fan Club." The group may be a virtual space for group members to discuss theories about the show BREAKING BAD, such as why Walter White poisoned a child with Lily of the Valley berries instead of ricin, or why Gus wants to kill Walter. Next assume that Vince Gilligan and Bryan Cranston agree to do an interview via the multiplex live group communication interface discussed herein. Breaking Bad Fan Club group members are invited to view the interview, but not to participate with visual or audio input. However, group members may be encouraged to post comments and questions to Gilligan and Cranston in comment section 540. This way, Gilligan, Cranston, and an interviewer may conduct the interview without all the group members from the entire Breaking Bad Fan Club group participating and trying to talk to Gilligan and Cranston.

As another example illustrating how it may be possible to restrict participation of a group chat to particular group members, consider the following scenario. There may be a group chat where only certain group members (e.g., moderators) will be able to participate or engage in a group chat, and those members may then broadcast the chat to the group. The group members may watch the group chat and post comments associated with the group chat, but they may not be able to participate in the group chat. For example, a group may exist called "Republicans." The Republicans group may include hundreds of thousands of republicans as well as Republican nomination candidates (e.g., Ted Cruz, Donald Trump, Jon Kasich, etc.). The presidential candidates may have a debate. The debate may be broadcast live over group chat. All members of the group may watch the debate as a group chat, but not every group member may participate in the group chat. However, all members may be able to post comments on the group chat.

A group may include designated participants who have special roles. As an example and not by way of limitation, a group may designate one group member to be an administrator, another group member may be designated as a moderator, another as a gatekeeper, and so on. These roles may be permanent, may change at a particular time, or may be designated for the duration of a particular chat. In addition, roles may be based on topic. For example, in the Quadcopters group, Corey may be the moderator in charge of microcontrollers, so that Corey may review all the content related to microcontrollers that is added to the web page(s) associated with the group. Other group members may be in charge of other topics, such as camera-type, batteries, propellers, and the like.

Additionally, group members may have different levels of privilege. The levels of privilege may allow some members to perform actions which other members are not allowed to do. As an example and not by way of limitation, Amy may have a the privilege of initiating group chats, whereas Chris may not have such a privilege. Privileges could extend to any aspect of the group or group chat, including adding new group members, posting content, initiating or ending group chats, removing members from the group, or any other suitable action.

When a group chat with three or more participants is underway, the primary participant who is speaking (e.g., speaker) will be detected, and the speaker's video stream will appear on the screens of the other participants. While the speaker is speaking, the speaker's own screen may show either an array of all (or a subset of) the other participants or a single participant (e.g., the last participant to speak, the initiator, the participant with whom the speaker has the greatest affinity, or a designated participant). Group chat participants also have the option to view only one participant by selecting to view that participant.

If signal is lost on one or more devices, each device may automatically try to reconnect to the same broadcast that the device was on before the signal was lost. This disclosure also contemplates that a broadcast of a videogame or video footage either uploaded by one of the group members or streamed from a third party (e.g., Hulu, YouTube, Netflix) could be broadcast as a group chat. It may be possible to save the group chat both locally and on the communication system or social-networking system after the group chat ends.

There may be multiple group chats occurring simultaneously within the same group. Group members may have the option to join or leave any group chat they wish, or to be part of multiple group chats at the same time. Multiple group chats in the same group may be referred to as "channels." A group member can swipe or click through the channels (e.g., group chats that are currently happening) and join whichever group chat or chats she wishes.

Figure 6:
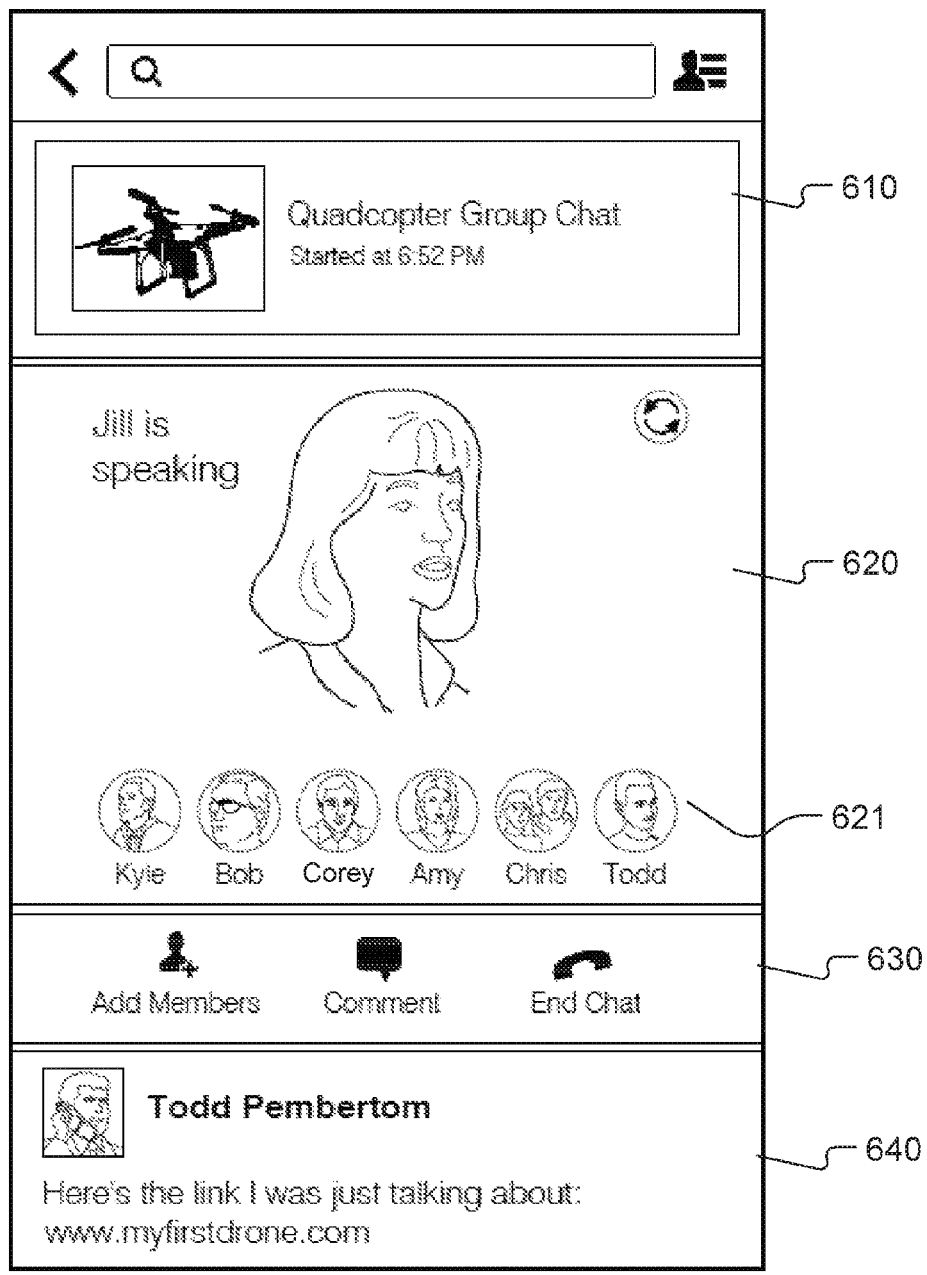
FIG. 6 illustrates another example interface for conducting a multiplex live group communication.

FIG. 6 illustrates another example interface for conducting a multiplex live group communication. Interface illustrated in FIG. 6 may include title bar 610, video display area 620, participant icons 621, action bar 630, and comment section 640. Video display area 620 indicates that Jill is speaking. This may be because the communication system detected higher audio signals coming from Jill's computing device, so the communication switched display from a different speaker to Jill. As an example and not by way of limitation, assume that at a first time (e.g., 2 minutes into the group chat), Corey is speaking and the images captured by Corey's active camera are displayed on video display area 620. Then Jill interrupts Corey and begins speaking at a second time (e.g., 2 minutes, 30 seconds into the group chat). Because Jill began speaking, the communication system switches the source of the images displayed on video display area 620 to the images captured by Jill's active camera.

Figure 7:
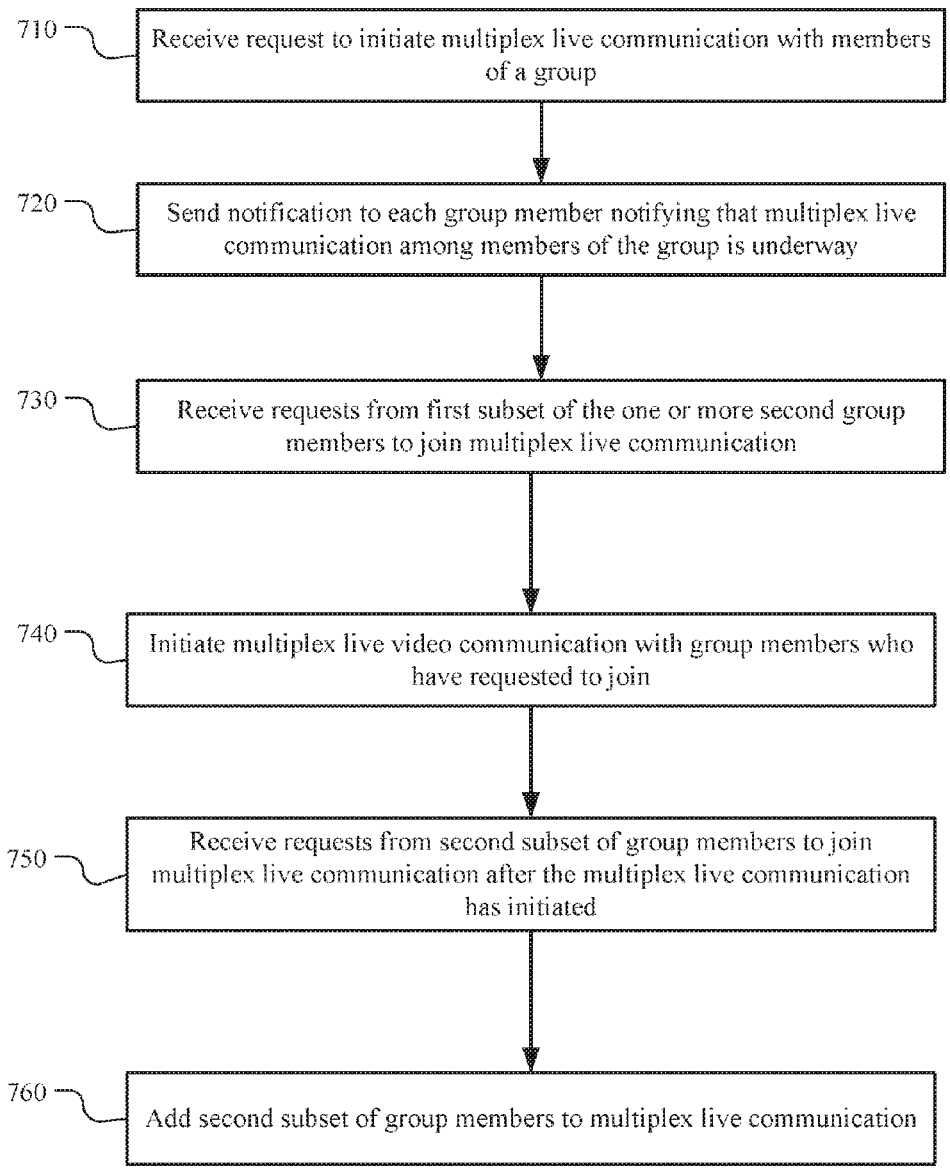
FIG. 7 illustrates an example method for initiating and conducting a multiplex live group communication.

FIG. 7 illustrates an example method 700 for initiating and conducting a multiplex live group communication. The method may begin at step 710, where a computer server operated by the social networking system or the communication system receives from a first group member a request to initiate a multiplex live communication with members of a group, wherein the first group member belongs to the group. At step 720, the computer server may send a notification to each of one or more second group members notifying the one or more second group members that a multiplex live communication among members of the group is underway, wherein the one or more second group members belongs to the group. At step 730, the computer server may receive one or more requests from a first subset of the one or more second group members to join the multiplex live communication. A request to join the multiplex live communication may be a response to the notification sent by the computer server and received by the group member. For example, if a group member Chris requests to initiate the multiplex live communication (e.g., by selecting group chat icon 131), the computer server may send a notification to each member of the group that Chris invites to the group chat. The notification may indicate that another group member has initiated a group chat, and may ask the group member if she wants to join the chat. To continue the above example, Jill may receive a notification stating, "Chris has invited you to a group chat in 'Quadcopters.' Would you like to join?" Jill may then have the opportunity to join the group chat, or to deny the request. Jill may also respond with a comment to Chris or to the entire group. For example, if Jill is unable to attend the group chat, she may decline the request and respond with a comment like, "I'm sorry I can't make the chat—I have to watch Downton Abbey right now. Maybe next time!" This may enable Chris or the other group chat participants to understand that Jill has some other more important matter to attend to. At step 740, the computer server may initiate the multiplex live video communication between the first group member and the first subset of the one or more second group members who requested to join the multiplex live communication. The communication system may determine when at least two group chat participants are ready to begin the group chat, and may begin the multiplex live communication at that time. At step 750, the computer server may receive requests from a second subset of group members to join the multiplex live communication after the multiplex live communication has initiated. This second subset of group members may be a single group member or several group members. This request from the second subset of group members may result from one or more group members wishing to join the multiplex live communication after it has already started. Group members may be added automatically, or alternatively, may be added a group administrator has approved them, in accordance with one or more group chat settings. In particular embodiments, participants of the multiplex live communication may receive notifications that one or more participants either have joined the group chat or are requesting to joint the group chat. At step 760, the computer server may add the second subset of group members to the multiplex live communication. Such action may be made in response to a group administer allowing the second subset of group members to join the group chat. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for initiating and conducting a multiplex live group communication including the particular steps of the method of FIG. 7, this disclosure contemplates any suitable method for initiating and conducting a multiplex live group communication including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In particular embodiments, the multiplex live communication may comprise audio and video communication. In particular embodiments, the multiplex live communication may comprise only audio communication. In particular embodiments, each group chat participant may have the option to participate in the group chat with audio and video enabled, or only audio enabled. This may allow group chat participants who are in transit to participate in the group chat without the visual communication enabled. As an example, and not by way of limitation, if Todd is invited to the group chat, but is driving at the time, he may participate in the group chat with only the audio enabled, so that he may drive and participate in the group chat simultaneously.

In particular embodiments, the method of FIG. 7 may further comprise receiving one or more requests from a second subset of the one or more second group members to join the multiplex live communication, wherein receiving the one or more requests from the second subset of the one or more second group members occurs after the multiplex live communication is already underway, and adding the second subset of the one or more second group members to the multiplex live communication. As an example and not by way of limitation, if the group chat has already begun and Amy and Bob request to join the group chat after the group chat has begun, the communication system may add Amy and Bob to the group chat.

In particular embodiments, the group may comprise the first group member and the one or more second group members, wherein the first group member and the one or more second group members have joined the group prior to and independently of any multiplex live communication.

In particular embodiments, the method of FIG. 7 may further comprise by a computer server, accessing a social graph comprising a plurality of nodes and a plurality of edges connecting the nodes, each of the edges between two of the nodes representing a single degree of separation between them, the nodes comprising: a first node corresponding to the first group member associated with an online social network, one or more second nodes that each correspond to the one or more second group members associated with the online social network, at least one third node corresponding to a concept or group identification associated with the online social network, wherein the first node and one or more second nodes are each connected by an edge to the third node.

In particular embodiments, the multiplex live communication may be displayed on a plurality of computing devices, each computing device corresponding to a member of the group. This may allow group chat participants to participate in the group chat in various locations, and may participate over the network.

In particular embodiments, the method of FIG. 7 may further comprise receiving audio data and visual data from each of the plurality of computing devices, displaying the visual data from each computing device on each computing device, analyzing the audio data and visual data to determine which member of the group is speaking, and displaying in real-time on each computing device the visual data captured on a camera associated with the computing device corresponding to the member of the group determined to be speaking.

Figure 8:
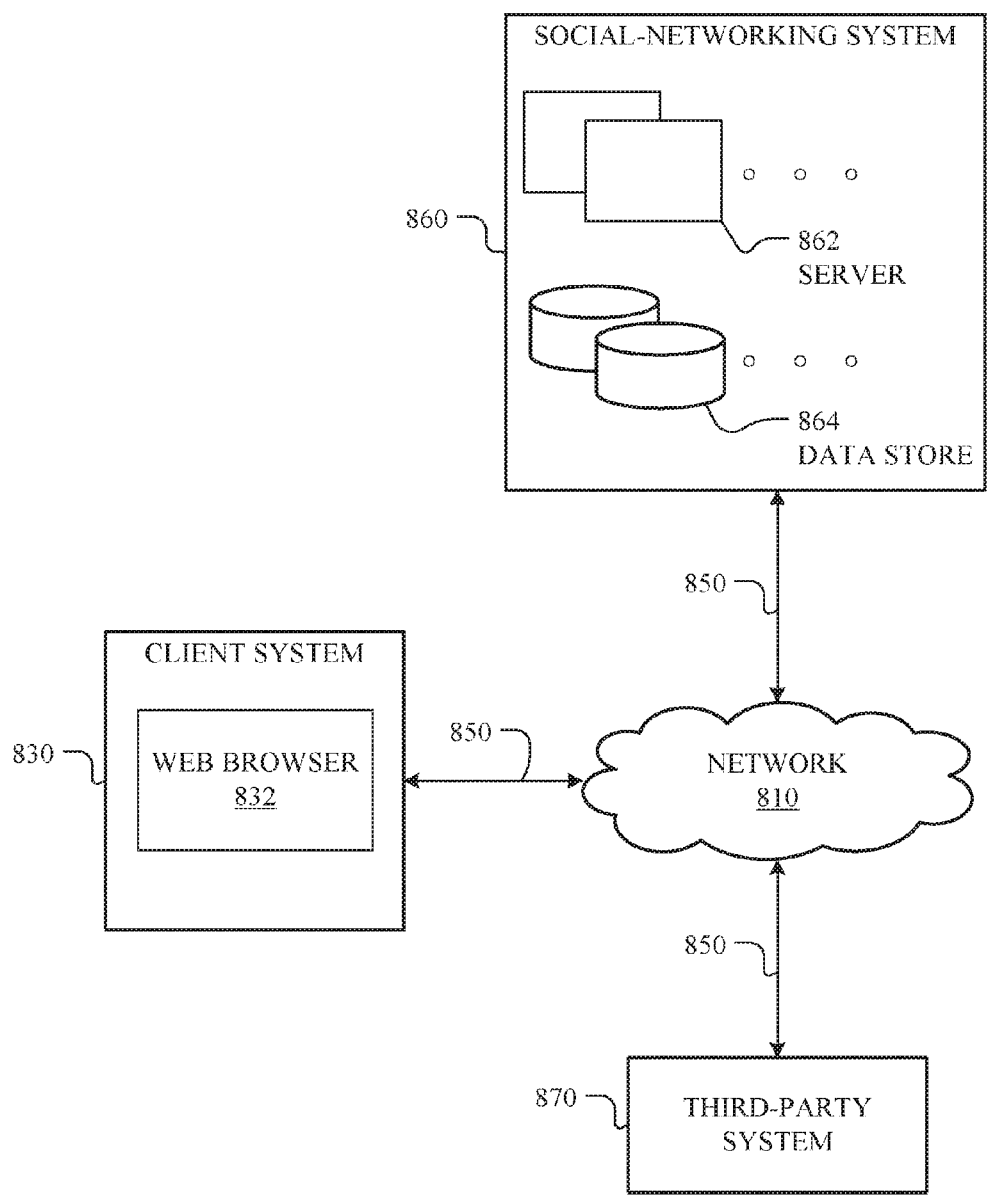
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
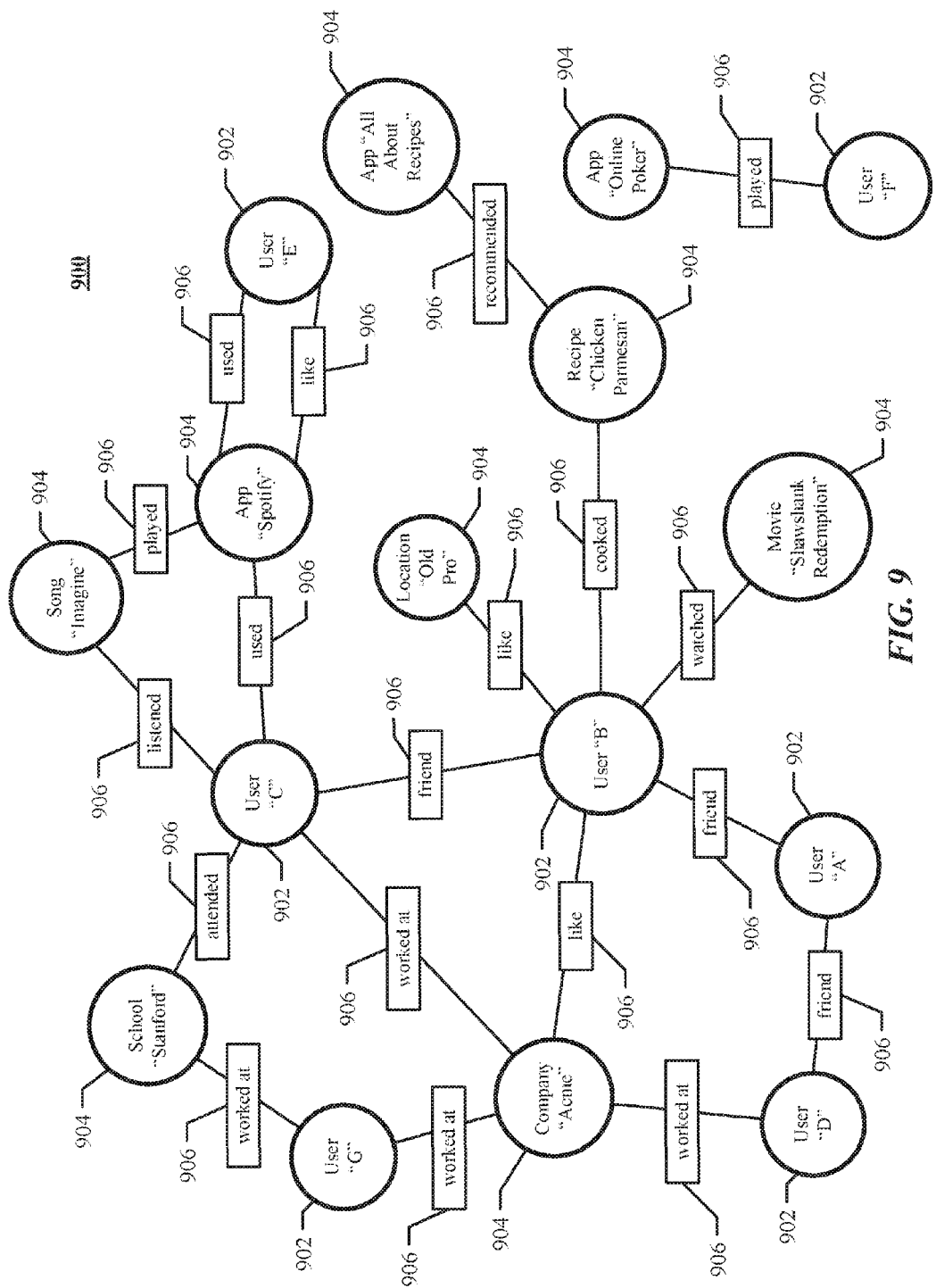
FIG. 9 illustrates an example social graph.

FIG. 9 illustrates example social graph 900. In particular embodiments, social-networking system 860 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 860, client system 830, or third-party system 870 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 860. As an example and not by way of limitation, a user may be an individual (human user), an entity (e.g., an enterprise, business, or third-party application), or a group (e.g., of individuals or entities) that interacts or communicates with or over social-networking system 860. In particular embodiments, when a user registers for an account with social-networking system 860, social-networking system 860 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 860. In particular embodiments, a user node 902 may be associated with information provided by a user or information gathered by various systems, including social-networking system 860. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 860 or a third-party website associated with a web-application server); an entity (such as, for example, a person, business, group, sports team, or celebrity); a resource (such as, for example, an audio file, video file, digital photo, text file, structured document, or application) which may be located within social-networking system 860 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including social-networking system 860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 860. Profile pages may also be hosted on third-party websites associated with a third-party server 870. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 870. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 830 to send to social-networking system 860 a message indicating the user's action. In response to the message, social-networking system 860 may create an edge (e.g., a check-in-type edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 860 may send a "friend request" to the second user. If the second user confirms the "friend request," social-networking system 860 may create an edge 906 connecting the first user's user node 902 to the second user's user node 902 in social graph 900 and store edge 906 as social-graph information in one or more of data stores 864. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 860 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 860 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 860 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships.

As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 860 may create an edge 906 between a user node 902 and a concept node 904 in social graph 900. As an example and not by way of limitation, a user viewing a concept-profile page (such as, for example, by using a web browser or a special-purpose application hosted by the user's client system 830) may indicate that he or she likes the concept represented by the concept node 904 by clicking or selecting a "Like" icon, which may cause the user's client system 830 to send to social-networking system 860 a message indicating the user's liking of the concept associated with the concept-profile page. In response to the message, social-networking system 860 may create an edge 906 between user node 902 associated with the user and concept node 904, as illustrated by "like" edge 906 between the user and concept node 904. In particular embodiments, social-networking system 860 may store an edge 906 in one or more data stores. In particular embodiments, an edge 906 may be automatically formed by social-networking system 860 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, two or more users may be connected to each other by way of membership to the same group in an online social network. This may be the only connection the two users have with each other. As an example and not by way of limitation, if Corey and Todd are both members of the "Quadcopters" group, a social graph may indicate a first user node associated with Corey, and a second user node associated with Todd. The social graph may also indicate a third node—a concept node, associated with the Quadcopters group. The social graph may further indicate an edge connecting the Quadcopter concept node to Todd's user node, indicating that Todd is a member of the Quadcopter group. The social graph may further indicate another edge connecting the Quadcopter concept node to Corey's user node, indicating that Corey is a member of the Quadcopter group. Thus, the social graph may indicate that Corey and Todd are both members of the Quadcopter group, and that Corey's user node and Todd's user node are connected to each other via the Quadcopter concept node.

In particular embodiments, social-networking system 860 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 870 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 860 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 860 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 860 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 860 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 860 may calculate a coefficient based on a user's actions. Social-networking system 860 may monitor such actions on the online social network, on a third-party system 870, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 860 may calculate a coefficient based on the user's actions with particular types of content. The content may be associated with the online social network, a third-party system 870, or another suitable system. The content may include users, profile pages, posts, news stories, headlines, instant messages, chat room conversations, emails, advertisements, pictures, video, music, other suitable objects, or any combination thereof. Social-networking system 860 may analyze a user's actions to determine whether one or more of the actions indicate an affinity for subject matter, content, other users, and so forth. As an example and not by way of limitation, if a user may make frequently posts content related to "coffee" or variants thereof, social-networking system 860 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 860 may calculate a coefficient based on the type of relationship between particular objects. Referencing the social graph 900, social-networking system 860 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 860 may determine that the user has a higher coefficient with respect to the first photo than the second photo because having a tagged-in-type relationship with content may be assigned a higher weight and/or rating than having a like-type relationship with content. In particular embodiments, social-networking system 860 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 860 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 860 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 830 of the user). A first user may be more interested in other users or concepts that are closer to the first user. As an example and not by way of limitation, if a user is one mile from an airport and two miles from a gas station, social-networking system 860 may determine that the user has a higher coefficient for the airport than the gas station based on the proximity of the airport to the user.

In particular embodiments, social-networking system 860 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 860 may provide information that is relevant to user's interests and current circumstances, increasing the likelihood that they will find such information of interest. In particular embodiments, social-networking system 860 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 860 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 860 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 870 (e.g., via an API or other communication channel), or from another suitable system. In response to the request, social-networking system 860 may calculate the coefficient (or access the coefficient information if it has previously been calculated and stored). In particular embodiments, social-networking system 860 may measure an affinity with respect to a particular process. Different processes (both internal and external to the online social network) may request a coefficient for a particular object or set of objects. Social-networking system 860 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 860 or shared with other systems (e.g., third-party system 870). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 870, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 862 may be authorization/privacy servers for enforcing privacy settings. In response to a request from a user (or other entity) for a particular object stored in a data store 864, social-networking system 860 may send a request to the data store 864 for the object. The request may identify the user associated with the request and may only be sent to the user (or a client system 830 of the user) if the authorization server determines that the user is authorized to access the object based on the privacy settings associated with the object. If the requesting user is not authorized to access the object, the authorization server may prevent the requested object from being retrieved from the data store 864, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 10:
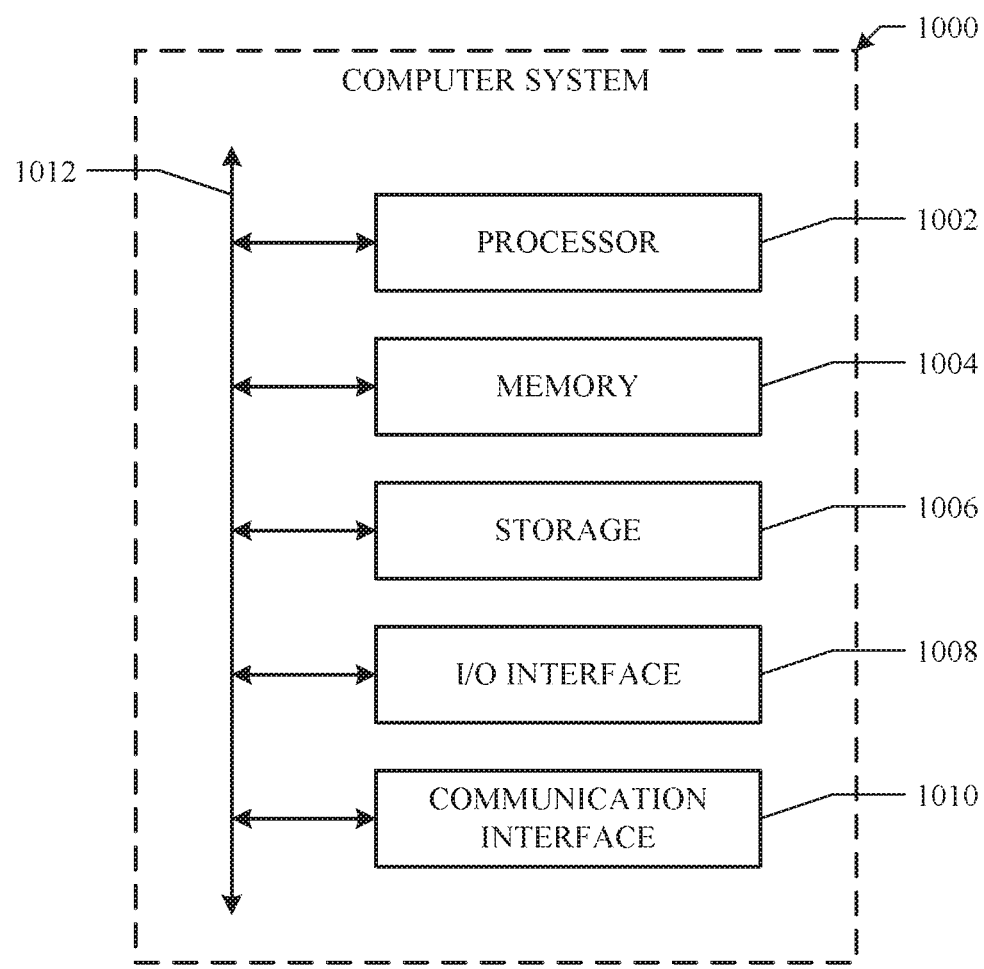
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
  by a computer server, receiving from a first group member a request to initiate a multiplex live communication with members of a group, wherein the first group member belongs to the group;
  by a computer server, sending a notification to each of one or more second group members notifying the one or more second group members that a multiplex live communication among members of the group is underway, wherein the one or more second group members belongs to the group, and wherein:
    the first group member corresponds to a first node in a social graph, the one or more second group members each correspond to one or more second nodes in the social graph, and the group corresponds to a third node in the social graph; and the first node and the one or more second nodes are each connected by an edge to the third node;

by a computer server, receiving one or more requests from a first subset of the one or more second group members to join the multiplex live communication; and by a computer server, initiating the multiplex live video communication between the first group member and the first subset of the one or more second group members who requested to join the multiplex live communication.

2. The method of claim 1, wherein the multiplex live communication comprises audio and video communication.

3. The method of claim 1, wherein the multiplex live communication comprises only audio communication.

4. The method of claim 1, further comprising:
receiving one or more requests from a second subset of the one or more second group members to join the multiplex live communication, wherein receiving the one or more requests from the second subset of the one or more second group members occurs after the multiplex live communication is already underway; and
adding the second subset of the one or more second group members to the multiplex live communication.

5. The method of claim 1, wherein the group comprises the first group member and the one or more second group members, wherein the first group member and the one or more second group members have joined the group prior to and independently of any multiplex live communication.

6. The method of claim 1, wherein the multiplex live communication is displayed on a plurality of computing devices, each computing device corresponding to a member of the group.

7. The method of claim 6, further comprising:
by a computer server, receiving audio data and visual data from each of the plurality of computing devices;
by a computer server, displaying the visual data from each computing device on each computing device;
by a computer server, analyzing the audio data and visual data to determine which member of the group is speaking; and
by a computer server, displaying in real-time on each computing device the visual data captured on a camera associated with the computing device corresponding to the member of the group determined to be speaking.

8. One or more computer-readable non-transitory storage media embodying software that is operable when executed to:
receive from a first group member a request to initiate a multiplex live communication with members of a group, wherein the first group member belongs to the group;
send a notification to each of one or more second group members notifying the one or more second group members that a multiplex live communication among members of the group is underway, wherein the one or more second group members belongs to the group, and wherein:
the first group member corresponds to a first node in a social graph, the one or more second group members each correspond to one or more second nodes in the social graph, and the group corresponds to a third node in the social graph; and
the first node and the one or more second nodes are each connected by an edge to the third node;

receive one or more requests from a first subset of the one or more second group members to join the multiplex live communication; and
initiate the multiplex live video communication between the first group member and the first subset of the one or more second group members who requested to join the multiplex live communication.

9. The media of claim 8, wherein the multiplex live communication comprises audio and video communication.

10. The media of claim 8, wherein the multiplex live communication comprises only audio communication.

11. The media of claim 8, wherein the software is further operable when executed to: receive one or more requests from a second subset of the one or more second group members to join the multiplex live communication, wherein receiving the one or more requests from the second subset of the one or more second group members occurs after the multiplex live communication is already underway; and
add the second subset of the one or more second group members to the multiplex live communication.

12. The media of claim 8, wherein the group comprises the first group member and the one or more second group members, wherein the first group member and the one or more second group members have joined the group prior to and independently of any multiplex live communication.

13. The media of claim 8, wherein the multiplex live communication is displayed on a plurality of computing devices, each computing device corresponding to a member of the group.

14. The media of claim 8, wherein the software is further operable when executed to:
receive audio data and visual data from each of the plurality of computing devices;
display the visual data from each computing device on each computing device;
analyze the audio data and visual data to determine which member of the group is speaking; and
display in real-time on each computing device the visual data captured on a camera associated with the computing device corresponding to the member of the group determined to be speaking.

15. A system comprising: one or more processors; and a memory coupled to the processors comprising instructions executable by the processors, the processors being operable when executing the instructions to:
receive from a first group member a request to initiate a multiplex live communication with members of a group, wherein the first group member belongs to the group;
send a notification to each of one or more second group members notifying the one or more second group members that a multiplex live communication among members of the group is underway, wherein the one or more second group members belongs to the group, and wherein:
the first group member corresponds to a first node in a social graph, the one or more second group members each correspond to one or more second nodes in the social graph, and the group corresponds to a third node in the social graph; and
the first node and the one or more second nodes are each connected by an edge to the third node;
receive one or more requests from a first subset of the one or more second group members to join the multiplex live communication; and
initiate the multiplex live video communication between the first group member and the first subset of the one or more second group members who requested to join the multiplex live communication.

16. The system of claim 15, wherein the multiplex live communication comprises audio and video communication.

17. The system of claim 15, wherein the multiplex live communication comprises only audio communication.

18. The system of claim 15, wherein the processors are further operable when executing the instructions to:
- receive one or more requests from a second subset of the one or more second group members to join the multiplex live communication, wherein receiving the one or more requests from the second subset of the one or more second group members occurs after the multiplex live communication is already underway; and
- add the second subset of the one or more second group members to the multiplex live communication.

\* \* \* \* \*